United States Patent
Charlier et al.

(10) Patent No.: US 7,844,460 B2
(45) Date of Patent: Nov. 30, 2010

(54) AUTOMATIC CREATION OF AN INTERACTIVE LOG BASED ON REAL-TIME CONTENT

(75) Inventors: Michael L. Charlier, Palatine, IL (US); Sergey N. Baranov, St. Petersburg (RU); Joong Thye Lee, Singapore (SG); Carlton J. Sparrell, Marblehead, MA (US); Yaxin Zhang, Shanghai (CN)

(73) Assignee: Motorola, Inc., Schaumburg, IL (US)

( * ) Notice: Subject to any disclaimer, the term of this patent is extended or adjusted under 35 U.S.C. 154(b) by 959 days.

(21) Appl. No.: 11/675,139

(22) Filed: Feb. 15, 2007

(65) Prior Publication Data

US 2008/0201142 A1 Aug. 21, 2008

(51) Int. Cl.
*G10L 15/18* (2006.01)

(52) U.S. Cl. .............. 704/257; 704/235; 704/270.1; 704/275; 704/277; 704/7; 709/231; 709/227; 709/203; 379/100.08; 379/88.03

(58) Field of Classification Search .......... 704/257, 704/235, 270.1, 275, 251, 277, 7, 27, 270; 709/231, 227, 203; 379/100.08, 88.03; 369/25.01; 700/94
See application file for complete search history.

(56) References Cited

U.S. PATENT DOCUMENTS

| | | | |
|---|---|---|---|
| 6,175,819 B1 | 1/2001 | Van Alstine | |
| 6,477,491 B1 | 11/2002 | Chandler et al. | |
| 6,721,706 B1 * | 4/2004 | Strubbe et al. | 704/275 |
| 6,721,721 B1 * | 4/2004 | Bates et al. | 709/203 |
| 6,745,161 B1 * | 6/2004 | Arnold et al. | 704/7 |
| 6,910,003 B1 * | 6/2005 | Arnold et al. | 704/4 |
| 6,934,756 B2 * | 8/2005 | Maes | 709/227 |
| 6,950,501 B1 | 9/2005 | Chaturvedi et al. | |
| 6,976,082 B1 * | 12/2005 | Ostermann et al. | 709/231 |
| 7,054,819 B1 * | 5/2006 | Loveland | 704/273 |
| 7,177,402 B2 * | 2/2007 | Metcalf | 379/88.03 |
| 7,200,556 B2 * | 4/2007 | Aktas et al. | 704/235 |
| 7,203,759 B1 * | 4/2007 | Ostermann et al. | 709/231 |
| 7,272,558 B1 * | 9/2007 | Soucy et al. | 704/235 |
| 7,391,421 B2 * | 6/2008 | Guo et al. | 345/473 |
| 7,398,209 B2 * | 7/2008 | Kennewick et al. | 704/255 |
| 7,539,086 B2 * | 5/2009 | Jaroker | 369/25.01 |
| 7,697,668 B1 * | 4/2010 | Ostermann et al. | 379/100.08 |
| 2002/0077833 A1 | 6/2002 | Arons et al. | |
| 2003/0204399 A1 * | 10/2003 | Wolf et al. | 704/251 |
| 2005/0149870 A1 | 7/2005 | Van Ee et al. | |
| 2005/0154595 A1 * | 7/2005 | Bodin et al. | 704/277 |
| 2005/0190973 A1 | 9/2005 | Kristensson et al. | |

(Continued)

*Primary Examiner*—Vijay B Chawan
(74) *Attorney, Agent, or Firm*—John Bretscher; Valerie M. Davis

(57) ABSTRACT

A system [100] includes an audio reception device [105] to receive audio from a person speaking and convert the audio to a text format. An intelligent agent [110] receives the text format and detects at least one key term in the text format based on predetermined criteria. A logic engine [115] compares the at least one key term with a listener knowledge base [125] corresponding to a listener to determine context information corresponding to the at least one key term. A search device [135] searches for multimedia content corresponding to the context information. A communication device [150] communicates display content comprising at least one of: the multimedia content, and a link to the multimedia content to an electronic display device [155] adapted to display the display content.

14 Claims, 4 Drawing Sheets

U.S. PATENT DOCUMENTS

| | | | |
|---|---|---|---|
| 2005/0216443 A1 | 9/2005 | Morton et al. | |
| 2005/0228676 A1 | 10/2005 | Ifukube | |
| 2006/0116987 A1* | 6/2006 | Bernard | 707/3 |
| 2007/0265850 A1* | 11/2007 | Kennewick et al. | 704/257 |
| 2008/0154600 A1* | 6/2008 | Tian et al. | 704/251 |
| 2008/0161948 A1* | 7/2008 | Bodin et al. | 700/94 |
| 2008/0162130 A1* | 7/2008 | Bodin et al. | 704/235 |

\* cited by examiner

US 7,844,460 B2

AUTOMATIC CREATION OF AN INTERACTIVE LOG BASED ON REAL-TIME CONTENT

TECHNICAL FIELD

This invention relates generally to conversation analysis systems.

BACKGROUND

Many people participate in telephone conference calls, video conference calls, lectures, and/or net-meetings involving a variety of subjects. Sometimes it is known beforehand that a certain subject matter is going to be discussed in the phone call. Other times, however, topics are discussed that were not scheduled. Discussing such unscheduled topics can be problematic for people participating in conversations when such people have different levels of knowledge or understanding of the material discussed. When a speaker discusses a topic about which a listener knows little, the conversation can be difficult for the listener to follow and understand. For example, when an attorney is discussing a DNA sequence with someone having a PhD in biology, the person with the PhD may occasionally speak at a high level about the DNA sequence, i.e., at a level over the attorney's head.

In practice, a listener has several options for clarifying terms, concepts, acronyms, and any other topics of discussion. For example, the listener can take notes and look up more related information after the conference call. This option is undesirable, however, because it does not allow for real-time clarification. The listener could also interrupt the conversation to ask for more information or clarification. This option, unfortunately, breaks the flow of the conversation. This is particularly problematic when the conference call involves many people. The listener could also simultaneously look up more information using tools such as the Google™ search engine or Wikipedia™ online encyclopedia. Although this option can be useful, it requires much attention from the listener when searching for such information and the listener can become distracted from the discussion.

There are systems in the art for converting spoken words to text. These systems generally provide the actual converted text from the original audio without any additional detail.

BRIEF SUMMARY OF THE INVENTION

According to aspects of the present invention, a system includes an audio reception device that receives audio from a person speaking and converts the audio to text. An intelligent agent receives the text and detects at least one key term in the text based on predetermined criteria. A logic engine compares the key term(s) with a listener knowledge base corresponding to a listener to determine context information corresponding to the key term(s). A search device searches for multimedia content corresponding to the context information. A communication device communicates display content comprising at least one of: the multimedia content and a link to the multimedia content to an electronic display device of the listener.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
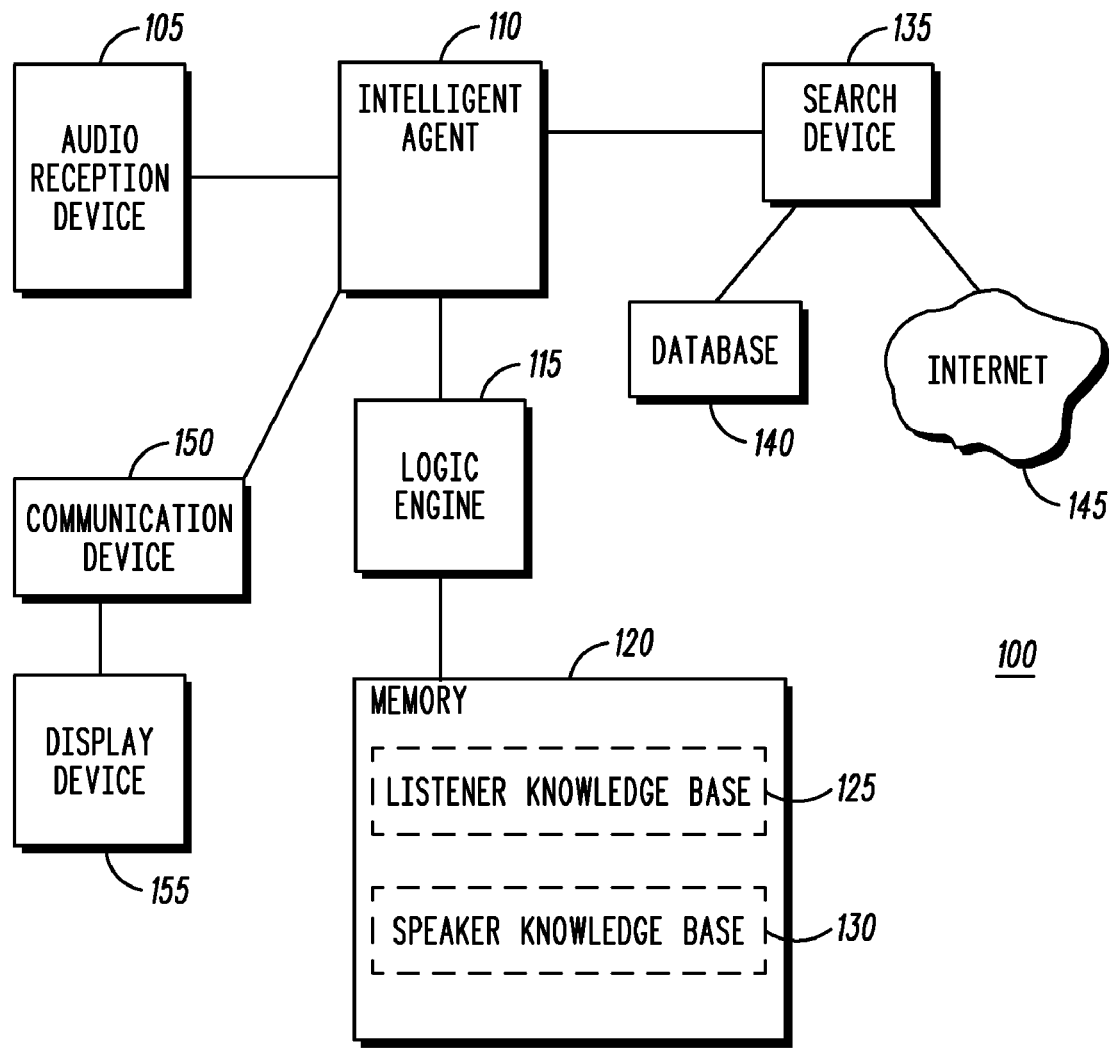
FIG. 1 illustrates a system for creating an interactive log for a conversation according to at least one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a method and system are provided for creating an interactive log based on an audible discussion, conversation, or lecture. The interactive log is created substantially in real-time. The teachings described below are applicable to embodiments involving one or more speakers engaging in a conversation, lecture, discussion, or some other type of communication with one of more listeners. By one approach, audio for a particular speaker is captured. For example, the speaker may speak directly into a microphone that converts the audio into corresponding audio signals. Alternatively, the audio may be provided by the speaker speaking into a telephone that converts the audio into an electronic signal transmitted over a telephone line. The audio may also be provided by a video camera or some other audio-visual device. For example, the audio may be provided by video conference equipment. In the event that video conference equipment is utilized, the audio may be separated from the video by, for example, a signal processor.

After the audio has been converted into audio signals, it is subsequently converted into text or some other usable format. In some embodiments, all of the audio is directly converted into text and a text stream is generated. A speech dictation system may be utilized for converting the audio to text. In other embodiments, key terms are detected within the audio and only the key terms are converted to text. The key terms may be determined based on measured stress levels in the speaker's voice when such key terms are spoken. To illustrate this point, in a lecture, the speaker may change his or her volume when discussing the most important terms in the discussion. In the event that the speaker is discussing various wireless technologies, the speaker might place emphasis on the phrase "CDMA-2000," and "CDMA-2000" may therefore be determined to be a key term based on the speaker's emphasis. Alternatively, one or more key terms may be determined, for example, by noting the number of times they are repeated (generally, or by various participants of the monitored dialogue).

The text may be provided to a listener or participant of the conversation. Teachings described herein provide an intelligent agent that determines whether a listener is familiar with key terms used in the conversation based on knowledge of the listener's background and/or analysis of previous conversations involving the listener. In the event that, for example, the system determines that the listener is unfamiliar with any key terms, the system conducts a search, such as an Internet search or a database search, to locate multimedia content corresponding to the key terms. If multimedia content corresponding to the key terms is found as a result of the search, such multimedia content is provided to the listener either directly as multimedia content viewed or played on the listener's electronic display device or as hyperlinks on which the listener can click to access the related multimedia content.

The text is transmitted to an intelligent agent after initially being converted from the original audio source. The intelligent agent may be a hardware device or a software module implemented by a processor. The intelligent agent handles processing related to the key terms. In the event that, for example, the audio is completely converted to a full text stream, the intelligent agent would be responsible for determining the key terms in the text stream. The key terms could be determined, for example, based on their position in the text stream or the number of times they are repeated. For example, words or phrases repeatedly used in a conversation may be more likely to be key terms than words or phrases used only a single time.

Another way of determining key terms is through the use of statistically improbable terms. There are a few ways of doing this. For example, the knowledge base could include a library of common words. Words outside of this would be considered improbable. For example, a word processing application with a spell check feature may be utilized. Uncommon words may be flagged, because they are unknown to the spellchecker. Similarly, a database (with perhaps fewer words than a spellchecker) could be used to flag uncommon words.

Once the key terms are determined, the intelligent agent may send the key terms to a logic engine. Alternatively, the logic engine may be contained within the intelligent agent. The logic engine is in communication with a memory. The memory stores a knowledge base for the listener. The knowledge base contains a user profile and may indicate key terms that are known or associated with the listener. For example, the knowledge base for a software designer might indicate the listener is familiar with software languages. The logic engine refers to the knowledge base to determine which of the detected key terms require additional information to provide to the listener. That is, based on the knowledge base for a particular listener, the logic engine determines the listener's likely level of understanding of the key term.

The listener knowledge base may also be utilized for disambiguation. For example, there are some words, terms, or acronyms that have more than one meaning, depending on the context in which they are used. The listener knowledge base may be used to determine which of the meanings are known to the listener and which are not. As a basic example, the word "driver" has different meanings, depending on the context in which it is used. For example, "driver" may refer to a person who drives a car, or a device driver, i.e., a program routine that links an operating system to a peripheral device. If the knowledge base indicates that the listener has a strong background in automobiles or is a fan of NASCAR™ racing, the logic engine determines that no search needs to be performed when the other context or words in the text indicate that the speaker is referring to an automobile driver. If, however, the conversation topic is directed toward device drivers, the logic engine may determine that the listener does not have a sufficient understanding of the term based on information in the listener's knowledge base.

The memory may also store a knowledge base for the speaker. The knowledge base for the speaker can also be utilized for disambiguation, i.e., to distinguish between the different meanings of words or other terms having more than one meaning. This can assist in determining the meaning of a key term when there is insufficient information stored in the knowledge base to determine the meaning of the term, such as when the listener is new to the system and does not yet have an extensive knowledge base or when the speaker is discussing a topic new to the listener. For example, if the speaker mentions the acronym "MHP," the knowledge base may indicate that the speaker is referring the acronym for "Multimedia Home Platform," and not some other phrase such as "Massachusetts Housing Partnership." The logic engine determines, based on the knowledge bases, which key terms are used and which need explanations or additional information to be provided to the listener.

The listener knowledge base is utilized to determine context information for one or more key terms. The context information may include the general meaning or field of a particular key term. In the example above where "driver" is a key word, the context information may correspond to a driver of an automobile and/or the entire field of automobiles. Moreover, in the example above where the acronym "MHP" is utilized, the context information may include indicate that the acronym corresponds to "Multimedia Home Platform" or the field of home computing.

Once the general meaning or field of the key term is determined, a search device or engine searches for multimedia, such as text, audio, or video pertaining to the context information of the key terms. When such multimedia is located, a link to the multimedia is retrieved. The search device/engine may include logic to determine a correlation between the multimedia and the key terms. In the event that the correlation is greater than a predetermined threshold, a link to the multimedia is retrieved and provided to the intelligent agent. A communication device provides the link to a display device used by the listener. For example the link may be a hyperlink in the event that the multimedia is located on a website. Alternatively, the actual multimedia itself may be retrieved by the search device and provided to the display device.

In some embodiments, the entire stream of text is displayed on the listener's display device. On other embodiments, only the key terms are displayed. In various embodiments the retrieved links and/or multimedia content itself are displayed on (or by) the listener's display device within a relatively short time period after such key terms have been spoken. The text stream, or the information for each term, can be organized into a three-level hierarchy. If the key term has multiple meanings, the information of each meaning will also have three-level explanations. The first level is a one sentence definition of the term. The second is a one paragraph summary of the term. And the third is more detailed description. The listeners can choose to display any level of information based on their need. However, the first level is a default.

A log of the entire conversation may be stored for later usage by the listener. For example, the listener may refer to the log after the conversation has ended and review the multimedia discovered by the search device to gain a greater understanding of the various key terms and concepts discussed during the conversation.

The listener's display device may be a Personal Digital Assistant ("PDA"), a cellular phone, a laptop computer, a television set-top box, or any other electronic device capable of displaying text and links to multimedia or the multimedia content itself. The teachings discussed herein provide a listener with the ability to focus on the conversation even though the listener might not have a complete understanding of all of the key terms used during the conversation. When the key terms are detected, information corresponding to the key terms is automatically located for the listener and the listener can simply glance down or at the display device to see if the key term is tagged and additional information is available. The listener can read such information or click on a link to generate more information. These teachings therefore enable more efficient and more productive lectures and conversations.

FIG. 1 illustrates a system for creating an interactive log for a conversation according to at least one embodiment of the invention. As shown, the system 100 includes an audio reception device 105. The audio reception device 105 is utilized to receive an audio input such as audio for a person speaking in a lecture, a discussion, or some other conversation and convert the audio input into a text format. Audio for each particular speaker is captured. For example, a speaker may speak directly into a microphone that coverts the audio into corresponding audio signals. Alternatively, the audio may be provided by a speaker speaking into a telephone that converts the audio into an electronic signal transmitted over a telephone line. The audio may also be provided by a video camera or some other audio-visual device. For example, the audio may be provided by video conference equipment. In the event that video conference equipment is utilized, the audio may be separated from the video by, for example, a signal processor. A speech dictation system may also be utilized for converting the audio to text. As discussed above, one or more speakers may engage in a conversation, lecture, discussion, or some other type of communication with one of more listeners. In some embodiments, all of the audio is converted to a stream of text. In other embodiments, only key terms are converted to text. The key terms are detected in a number of ways, such as detecting stress levels or volume increases in the audio input or the amount of repetition that certain words in the conversation are used. For example, repeated words are more like to be key terms.

Once converted to text, the text is provided to an intelligent agent 110. In the event that all (or substantially all) of the audio has been converted to text, the intelligent agent 110 determines the key terms within the text. If, on the other hand, only the key terms were converted to text by the audio capture device 105, then it may not be necessary for the intelligent agent 110 to determine the key terms. The intelligent agent 110 may be a hardware device or a software module implemented by a processor. The intelligent agent 110 handles processing related to the key terms. The key terms could be determined, for example, based on their position in the text stream or the number of times they are repeated. For example, words or phrases repeatedly used in a conversation may be more likely to be key terms as compared to words or phrases that are used only a single time.

Another way of determining key terms is through the use of statistically improbable terms. There are a few ways of doing this. For example, the knowledge base could include a library of common words. Words outside of this would be considered improbable. For example, a word processing application with a spell check feature may be utilized. Uncommon words may be flagged, because they are unknown to the spellchecker. Similarly, a database (with perhaps fewer words than a spellchecker) could be used to flag uncommon words.

As another example in this regard, the identification and development of key terms may be limited to only a single particular speaker. Speaker identification techniques are known, for example, to permit a given speaker to be particularly identified. This, in turn, can be used to limit key word identification to only, for example, a particular speaker in a multi-speaker conversation or discussion. This could be used, for example, to prevent key words from being developed for a given user based upon that given user's own spoken content.

Once the key terms are determined, the intelligent agent 110 may send the key terms to a logic engine 115. The logic engine 115 is in communication with a memory 120. The memory 120 stores a knowledge base 125 for the listener. The listener knowledge base 125 contains a user profile and may indicate key terms that are associated with the listener. The listener knowledge base 125 can be utilized to distinguish between two (or more) different meanings for the same term.

The memory 120 may also store a knowledge base 130 for the speaker. The speaker knowledge base 130 can also be utilized for disambiguation, i.e., to distinguish between the different meanings of words or other terms having more than one meaning. This can assist in determining the meaning of a key term when there is insufficient information stored in the listener knowledge base 125 to determine the meaning of the word, such as when the listener is new to the system and does not yet have an extensive listener knowledge base 125 or when the speaker is discussing a topic new to the listener such as, for example, when the speaker is discussing DNA strands with a listener who is a mechanical engineer.

Once the logic engine 115 determines the appropriate key terms for which additional information needs to be located, the logic engine 115 communicates the identity of the appropriate key terms back to the intelligent agent 110. The logic engine 115 may also send context information regarding the particular meaning of the word in the event that the key term has multiple known meanings. Such context information may be information obtained from one of the listener and speaker knowledge bases. The intelligent agent 110 transmits such context information to a search device 135.

By one approach the search device 135 searches for multimedia content, such as text, audio, or video pertaining to the context information. The search device 135 may search, for example, a database 140 or the Internet 145. When such multimedia is located, a link to the multimedia content is retrieved. The search device 135 may include logic to determine a correlation between the multimedia content and the key terms. In the event that the correlation is greater than a predetermined threshold, a link to the multimedia content is retrieved and provided to the intelligent agent 110. A communication device 150 provides the link to a display device used by the listener. For example, the link may be a hyperlink in the event that the multimedia content is located on a website. Alternatively, the actual multimedia content itself may be retrieved by the search device 135 and provided to the display device 155.

Figure 2:
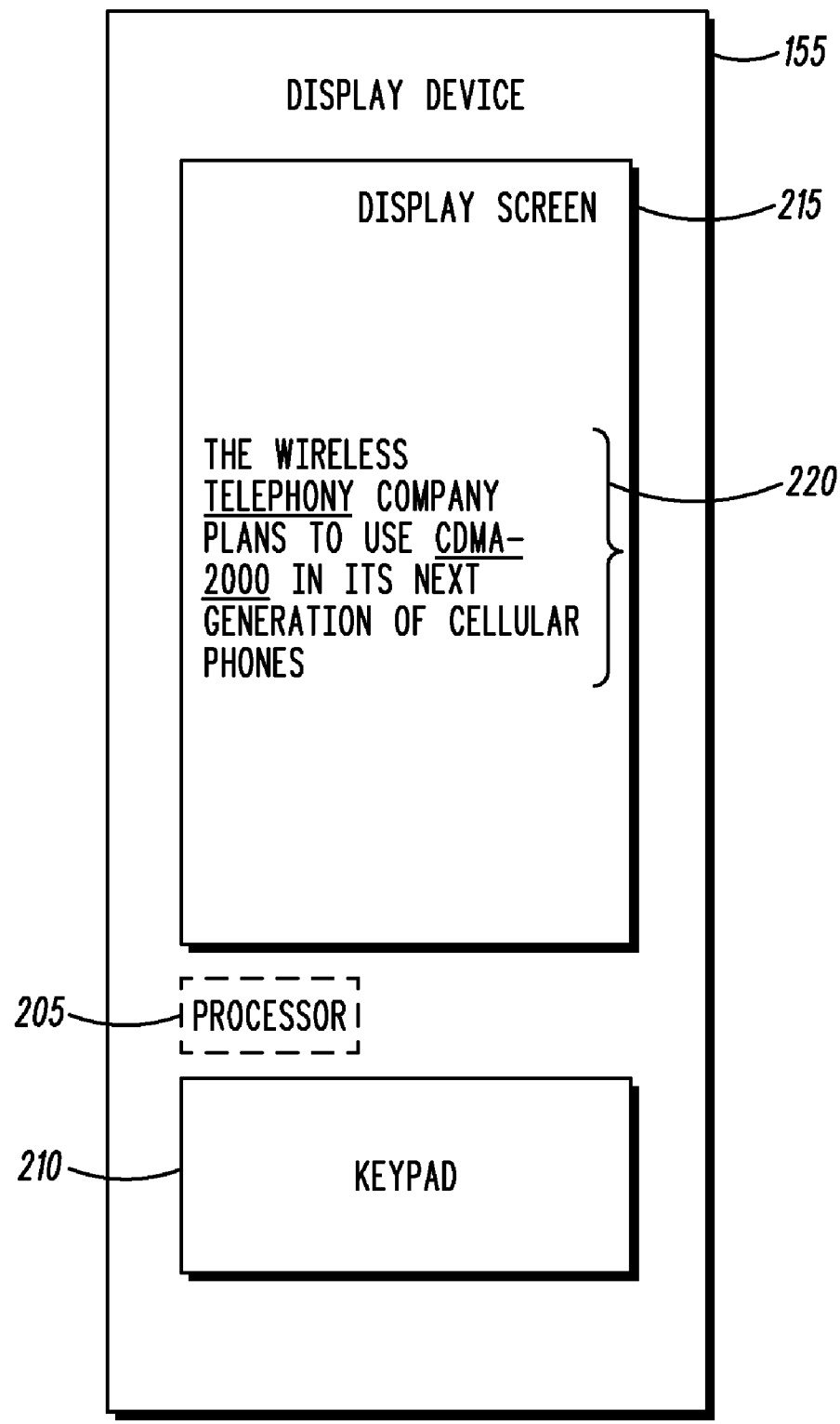
FIG. 2 illustrates the display device according to at least one embodiment of the invention.

FIG. 2 illustrates the display device 155 according to at least one embodiment of the invention. As discussed above, the display device 155 may be a PDA, a cellular phone, a laptop computer, a television set-top box, or any other electronic device capable of displaying text and links to multimedia content or the multimedia content itself. The display device 155 may include a processor 205, a keypad 210, and/or another user input device to receive inputs from a listener. The display device also includes a display screen 215, such as a Liquid Crystal Display ("LCD") or any other suitable display capable of displaying the text, links to multimedia content, and/or the multimedia content itself.

As shown, the display screen 215 illustrates a stream of text from an audible conversation, such as a lecture, that has been converted to text 220 and processed by the intelligent agent 110 shown in FIG. 1. The text 220 shown on the display screen 215 reads "the wireless telephony company plans to use CDMA-2000 in its next generation of cellular phones." The terms "telephony" and "CDMA-2000" are determined to be key terms by the intelligent agent 110 and the search device 135 has searched for multimedia content corresponding to these key terms. The key terms are underlined to indicate that they are links to corresponding multimedia content located by the search device 135. For example, by clicking on the link for the key term "CDMA-2000," the listener can access multimedia content relating to CDMA-2000, such as a website with information about CDMA-2000. Alternatively, in the event that the display screen 215 is a touch screen, the listener may touch an area of the display screen 215 near where the CDMA-2000 key term is shown to access the multimedia content.

In alternative embodiments, and to continue with the illustrative context presented above, the display screen 215 can display a definition of CDMA-2000 directly on the display screen 215 without requiring any interaction from the listener. In some embodiments, the display screen 215 sometimes displays links and also sometimes displays the actual multimedia content itself. By one approach the listener may set a preference regarding whether the actual multimedia content is to be automatically delivered as opposed to a mere link to the multimedia content.

In some embodiments, information for a particular key term may be organized according to a hierarchy, such as a three-tier hierarchy. The first level of the hierarchy includes a relatively short definition of the one key term, such as a one-sentence definition. The second level includes a paragraph summary of the key term. The third level includes a detailed description of the key term.

Figure 3:
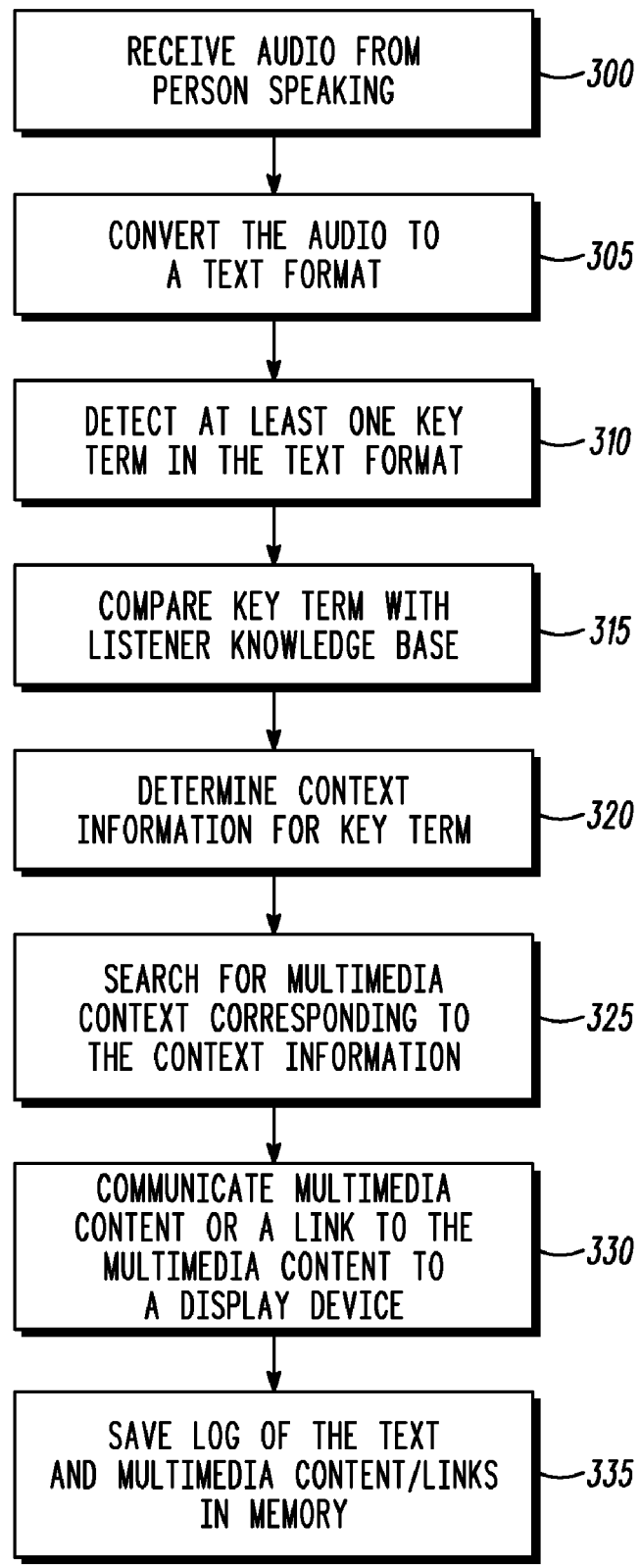
FIG. 3 illustrates a method of generating an interactive log based on audio received from a person speaking according to at least one embodiment of the invention.

FIG. 3 illustrates a method of generating an interactive log based on audio received from a person speaking according to at least one embodiment of the invention. First, at operation 300, audio is received from the person speaking. Next, at operation 305, the audio is converted to a text format, such as alphanumeric characters. There are various ways known in the art by which such steps can be effected. As the present teachings are not overly sensitive to any particular selections in this regard, and further for the sake of brevity, further elaboration regarding such approaches will not be provided here. At operation 310, at least one key term is detected in the text format. This detection may be performed by the intelligent agent 110 as discussed above with respect to FIG. 1.

The key term is then compared with a listener knowledge base 125 for a listener of the conversation at operation 315, as discussed above with respect to FIG. 1. Next, at operation 320, context information is determined for the key term based on the comparison of the key term with the listener knowledge base 125 performed at operation 315. A search is subsequently performed for multimedia content corresponding to the context information at operation 325. The search may be performed on a database, the Internet, a memory, or some other source or network of information. After the corresponding media content is found, a link to the multimedia content, or the multimedia content itself, is communicated to the listener's display device 155 at operation 330. Finally, at operation 335, a log of the text and links to the multimedia content or the multimedia content itself is saved in a memory, such as the memory 120 shown in FIG. 1. Alternatively, the log may be stored in a memory other than the one in which the listener knowledge base 125 and the speaker knowledge base are stored, such as a local memory of the display device 155.

Figure 4:
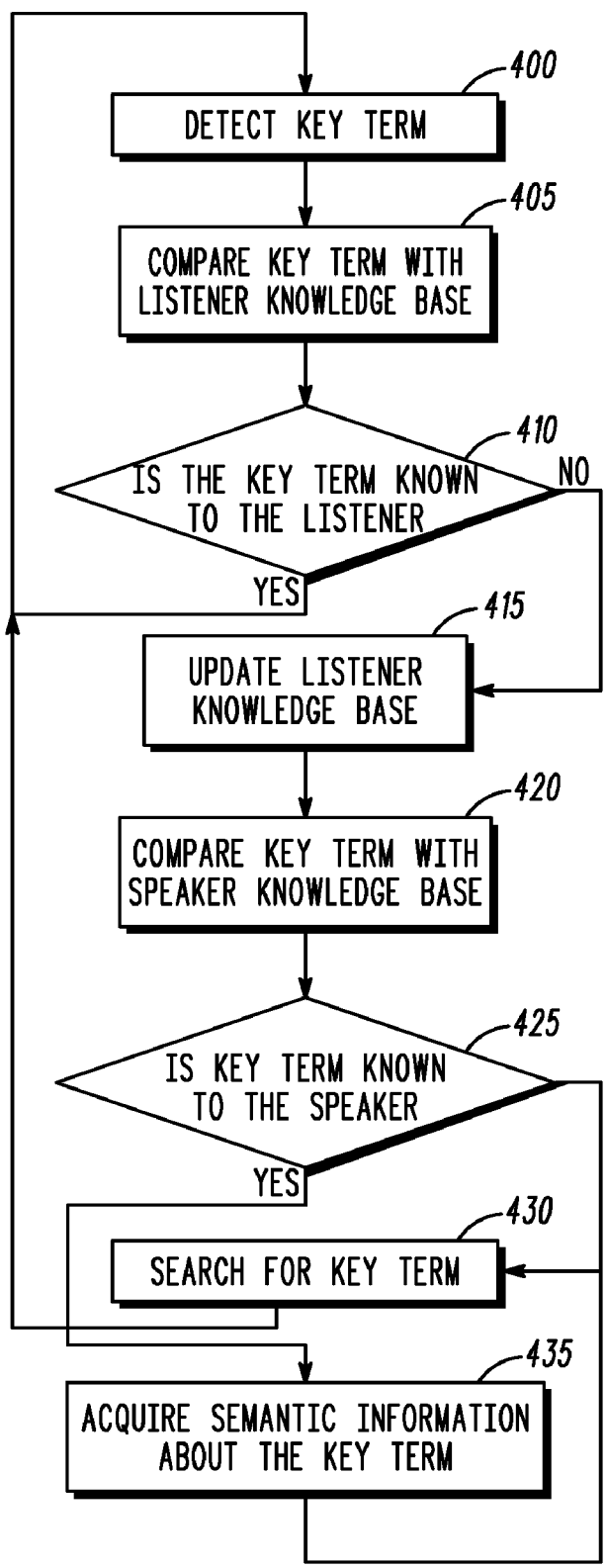
FIG. 4 illustrates a method of generating an interactive log based on audio received from a person speaking according to at least one embodiment of the invention.

FIG. 4 illustrates a method of generating an interactive log based on audio received from a person speaking according to at least one embodiment of the invention. First, at operation 400, a key term is detected in a stream of text. Next, the key term is compared with a listener knowledge base 125 at operation 405. A determination is subsequently made regarding whether the key term is known to the listener at operation 410. If "yes," processing returns to operation 400. If "no," on the other hand, processing proceeds to operation 415 where the listener knowledge base 125 is updated. The key term is then compared with a speaker knowledge base 130 at operation 420. A determination is made regarding whether the key term is known to the speaker at operation 425. This determination is based on whether the speaker knowledge base 130 contains any information about the key term. If "yes" at operation 425, processing proceeds to operation 435. If "no," on the other hand, processing proceeds to operation 430 where a search is performed for information relating to the key term. This search may be performed on a database, the Internet, or some other network of choice. Processing then returns to operation 400. Finally, at operation 435, semantic information about the key term is acquired based on the speaker's knowledge of the key term that was determined at operation 425. The semantic information may indicate a basic definition of the key term or related terms that can be used when searching for information about the key term. Finally, processing returns to operation 430.

The teachings discussed herein provide a listener with the ability to focus on a conversation even though the listener might not have a complete understanding of all of the key terms used during the conversation. When key terms are detected, information corresponding to the key terms is automatically located for the listener and the listener can simply glance down at the display device to see if the key term is tagged and additional information is available. The listener can read such information or click on a link to generate more information. These teachings therefore enable more efficient and more productive lectures and conversations.

So configured, those skilled in the art will recognize and appreciate that a conversation, lecture, or discussion between two or more participants can be greatly enhanced through the use of an intelligent agent that has an ability to determine key terms in the conversation and whether a listener is familiar with the key terms or needs additional information about the key terms. These teachings are highly flexible and can be implemented in conjunction with any of a wide variety of implementing platforms and application settings. These teachings are also highly scalable and can be readily utilized with almost any number of participants.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one example in this regard, these teachings could be employed in conjunction with television viewing. A person watching a news program, for example, could avail themselves of additional detail and content as might pertain to tagged information developed by such a system and as is based upon the spoken content of such a news program.

We claim:

1. A system comprising:
an audio reception device to receive audio from a person speaking and convert the audio to a text format;

an intelligent agent to receive the text format and detect at least one key term in the text format based on predetermined criteria;

a logic engine to compare the at least one key term with a listener knowledge base corresponding to a listener, the listener distinct from the person speaking, to determine context information corresponding to the at least one key term;

a search device to search for multimedia content corresponding to the context information;

a communication device to communicate display content comprising at least one of: the multimedia content and a link to the multimedia content; and an electronic display device to display the display content to the listener.

2. The system of claim 1 wherein the search device is adapted to search for the multimedia content in at least one of: a database and the Internet.

3. The system of claim 1 wherein the electronic display device comprises at least one of: a wireless telephone, a Personal Digital Assistant, a laptop computer, and a television set-top box.

4. The system of claim 1 wherein the logic engine is adapted to update the listener knowledge base based on a detection of the at least one key term.

5. The system of claim 1 further comprising a memory to store the listener knowledge base.

6. The system of claim 5 wherein the memory is further adapted to store a speaker knowledge base corresponding to the person speaking, and wherein the logic engine is adapted to utilize the speaker knowledge base to disambiguate the at least one key term.

7. The system of claim 1 wherein the intelligent agent is adapted to store the text format and the multimedia content in a log in a memory.

8. The system of claim 1 wherein the intelligent agent is adapted to organize the display content into at least a three-level hierarchy, wherein a first level comprises a relatively short definition of the at least one key term, a second level comprises a paragraph summary of the at least one key term, and a third level comprises a detailed description of the at least one key term.

9. A method comprising:
receiving audio from a person speaking;
converting the audio to a text format;
detecting at least one key term in the text format based on predetermined criteria;
comparing the at least one key term with a listener knowledge base corresponding to a listener, the listener distinct from the person speaking, to determine context information corresponding to the at least one key term;
searching for multimedia content corresponding to the context information;
communicating display content comprising at least one of: the multimedia content, and a link to the multimedia content; and
displaying the display content to the listener.

10. The method of claim 9 further comprising searching for the multimedia content in at least one of: a database and the Internet.

11. The method of claim 9 wherein the electronic display device comprises at least one of: a wireless telephone, a Personal Digital Assistant, a laptop computer, and a television set-top box.

12. The method of claim 9 further comprising updating the listener knowledge base based on a detection of the at least one key term.

13. The method of claim 9 further comprising storing the text format and the multimedia content in a log in a memory.

14. The method of claim 9 further comprising organizing the display content into at least a three-level hierarchy, wherein a first level comprises a relatively short definition of the at least one key term, a second level comprises a paragraph summary of the at least one key term, and a third level comprises a detailed description of the at least one key term.

* * * * *

UNITED STATES PATENT AND TRADEMARK OFFICE
CERTIFICATE OF CORRECTION

PATENT NO. : 7,844,460 B2  
APPLICATION NO. : 11/675139  
DATED : November 30, 2010  
INVENTOR(S) : Charlier et al.

Page 1 of 1

It is certified that error appears in the above-identified patent and that said Letters Patent is hereby corrected as shown below:

ON THE FACE PAGE

On the Face Page, in Field (58), under "Field of Classification Search", in Column 1, Line 2, delete "27, 270;" and insert -- 270; --, therefor.

IN THE SPECIFICATION

In Column 5, Line 22, delete "coverts" and insert -- converts --, therefor.

Signed and Sealed this  
Twenty-ninth Day of May, 2012

David J. Kappos  
*Director of the United States Patent and Trademark Office*